INVENTORS
GEORGE M. COLEMAN
ROBERT (NMI) RUCH
JEROME F. SMITH

ATTORNEYS

United States Patent Office 3,290,521
Patented Dec. 6, 1966

3,290,521
ELECTRO-MECHANICAL TRANSDUCER
George M. Coleman, 5614 Elk St., San Diego, Calif.;
Robert Ruch, R.F.D. Box 828, Gales Ferry, Conn.;
and Jerome Frost Smith, Box 113, U.S.N. Hospital,
Chelsea, Mass.
Filed Oct. 31, 1963, Ser. No. 320,584
4 Claims. (Cl. 310—2)

The invention described herein may be manufactured and used by or for the Government of the United States of America for governmental purposes without the payment of any royalties thereon or therefor.

The present invention relates to an electro-mechanical transducer and more particularly to a compliant electro-mechanical transducer.

The prior art transducers utilizing the so-called "U-effect" have all used a rigid capillary tube as the container of the two fluids which produce a voltage upon relative displacements. This type of transducer has several disadvantages. One disadvantage is the resultant difficulty when attempting to utilize the transducer as an accelerometer in fields such as ballistocardiography. Since the part of the body that is being studied can have a radical contour difference from that of the accelerometer numerous sizes and shapes of tubes are necessary or desirable. Its further disadvantage lies in the fact that only linear axial motion is detected by this type of accelerometer which again limits its utilization and efficiency as a transducer.

According to the invention, a transducer utilizing the U-effect of a non-wetting material such as mercury or gallium interspersed with an electrolyte (preferably a normal acid) within a capillary tube is constructed of a compliant material such as catheter tubing. Thus, the transducer can conform to the contours of any body or part thereof which is being studied, and at the same time higher efficiency is realized due to the displacement of the fluids caused by cross-sectional distortion as well as axial movement of the tubing.

It is thus an object of the present invention to provide an electro-mechanical transducer which can be entirely compliant.

Another object is to provide an electro-mechanical transducer which is responsive to cross-sectional distortion as well as axial motion.

A further object of the invention is the provision of an electro-mechanical transducer which is portable, rugged and inexpensive to construct.

Still another object is to provide an electromagnetic transducer which is simple in operation and requires a minimum of maintenance.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
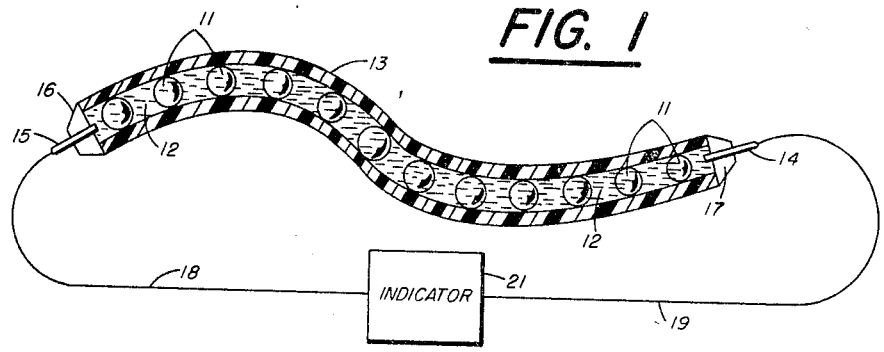
FIG. 1 illustrates a simple embodiment of the present invention.

Referring to FIG. 1 compliant tube 13 is filled with alternate segments of mercury, shown at 11, and an electrolyte such as a saline solution or sulphuric acid, shown at 12. Tube 13 must be compliant such as ordinary catheter tubing and for efficient operation should have an inside diameter less than one millimeter. Electrical probes 14 and 15 pass through plugs 17 and 16, respectively, to contact either the electrolyte 12 or a mercury globule 11. Leads 18 and 19 carry any resultant electrical potential to indicator 21. Indicator 21 can be a vacuum tube volt meter, cathode ray tube, or any suitable indicating or recording device.

Figure 2:
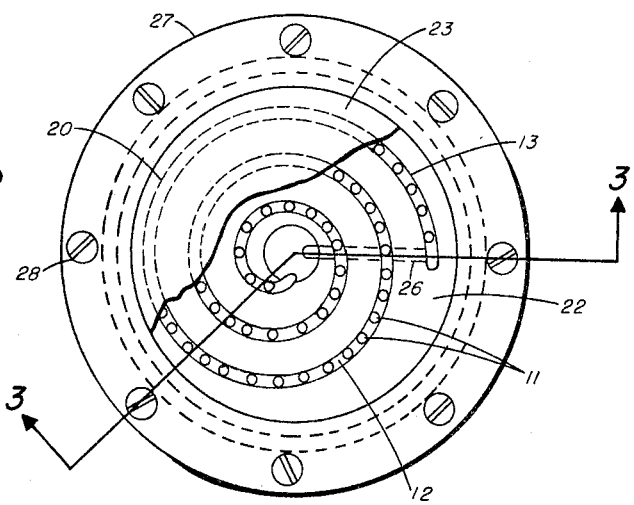
FIG. 2 illustrates a plan view of another embodiment of the present invention.

Referring to FIG. 2, capillary tube 13 is shown coiled and mounted between plate 22 and diaphragm 23, in spiral groove 20. Again mercury or gallium globules 11 are interspersed with an electrolyte 12.

Figure 3:
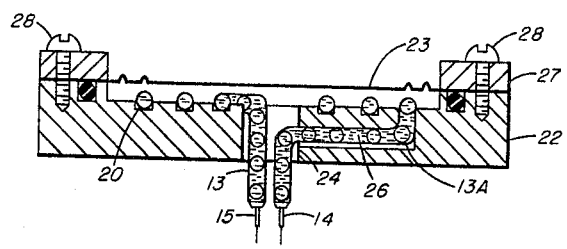
FIG. 3 illustrates a sectional view of FIG. 2 taken along line 33.

Referring to FIG. 3 a sectional view of FIG. 2 is shown with compliant tubing 13 brought out through bore 24 of base plate 22 and tube 13 is brought out through a passageway 26 in base plate 22. Diaphragm 23 is held between mounting ring 27 and base plate 22 by screws 28.

Referring back to FIG. 1, the operation will be described. In fields such as ballistocardiography, for example, electro-kinetic devices utilizing the U-effect have been utilized to provide patient or experimental information such as respiration and heartbeat of humans and animals. The prior art transducers of this type have been limited by the rigidity of the capillary tubes responding in the main to axial movement which will in turn cause a displacement of the mercury or gallium within the electrolyte, such as sulphuric acid. Here the utilization of compliant tubing not only makes this type of transducer much more compatible with this type of environment, but the output readings are much more desirable since not only does it respond to longitudinal movement, but the cross-sectional area will distort due to patient's breathing etc. causing a displacement itself of the interspersed elements within the capillary tubing, and a resulting increase of output voltage.

FIGS. 2 and 3 utilize the principle of FIG. 1 as applied to a hydrophone. Here as a sound wave or pressure wave strikes diaphragm 23 the diaphragm will impinge or squeeze the compliant tubing 13 again causing displacement of the elements within the compliant tubing causing an output voltage at terminals 14 and 15. Obviously a U-effect transducer utilizing rigid capillary tubing could not result in anything near the efficiency of the instant invention due to the limited movement resulting from the impinging of a shock wave.

It should be understood, of course, that the foregoing disclosure relates to only the preferred embodiments of the invention and that it is intended to cover all changes and modifications of the example herein chosen for the purposes of the disclosure which do not constitute departures from the spirit and scope of the invention.

What is claimed is:

1. An electro-mechanical transducer comprising:
   a hollow tube, said hollow tube having an inside diameter less than one millimeter;
   a plurality of layers of non-wetting conductive liquid within said tube;
   a liquid electrolyte between each of said layers forming distinct sections of electrolyte;
   a plurality of conductors, each projecting into a different one of said layers, the walls of said tube being of soft pliable material having high compliance to transmit pressure waves through the wall to said liquid within the tube, the hollow tube being easily flexed to any position, whereby a voltage is generated between said conductors in response to distortions of said tube.

2. An electro-mechanical transducer comprising:
   a hollow tube, said hollow tube being of a material having high compliance and being easily flexed to any position and having an inside dimension of capillary size;

a plurality of layers of a first liquid, said first liquid being one of the class comprising mercury and gallium;

a liquid electrolyte between each of said layers forming distinct sections of electrolyte;

a plurality of conductors, each projecting into a different one of said sections, whereby a voltage is generated between said conductors in response to distortions of said tube.

3. The electro-mechanical transducer defined in claim 2, further comprising;

a mounting plate, said tube carried by said mounting plate;

a diaphragm mounted in proximity to said mounting plate;

said tube being disposed between said mounting plate and said diaphragm to be squeezed when said diaphragm moves.

4. An electromagnetic transducer for electrocardiographic measurements comprising:

a capillary tube having a plurality of layers of mercury separated by layers of a substantially one normal acid; and a pair of electrodes each of said electrodes projecting into a layer of mercury near each end of the tube;

said tube being compliant, flexible and easily flexed to any position, and adapted to be fitted to any irregular body surface the motion of which is to be measured, whereby a voltage is generated between said conductors in response to distortions of said tube.

References Cited by the Examiner

UNITED STATES PATENTS 2,837,082   6/1958   Elliott _____ 310—2

MILTON O. HIRSHFIELD, *Primary Examiner.*

J. W. GIBBS, *Assistant Examiner.*